J. SMITH.
Springs for Vehicles.

No. 154,157.  Patented Aug. 18, 1874.

Witnesses
John L. Boone.
C. M. Richardson.

Inventor
John Smith
by Dewey &
Attys.

UNITED STATES PATENT OFFICE.

JOHN SMITH, OF SAN FRANCISCO, CALIFORNIA.

IMPROVEMENT IN SPRINGS FOR VEHICLES.

Specification forming part of Letters Patent No. 154,157, dated August 18, 1874; application filed June 23, 1874.

*To all whom it may concern:*

Be it known that I, JOHN SMITH, of San Francisco city and county, State of California, have invented a Carriage-Spring Head; and I do hereby declare the following description and accompanying drawings are sufficient to enable any person skilled in the art or science to which it most nearly appertains to make and use my said invention without further invention or experiment.

My invention relates to certain improvements in the heads which are formed at the ends of elliptic carriage-springs, for the purpose of uniting the opposite leaves with a firm and elastic joint. Hitherto these heads have been formed in two ways: First, by laying a piece of steel or iron upon the end of the spring-leaf, folding it over, and working it up into the proper shape, with suitable ears. The second method has been to form the ears by forging, punching, or stamping them out, and then selling them to the spring-makers, this being a separate branch of manufacture. These ears must then be welded to the sides of the spring-leaf, with a gage or guide to hold them to their place, so that the holes for the bolt will not get out of line, the whole operation being very tedious and costly.

My invention contemplates the manufacture of a head, all in one piece, of cast-steel or malleable iron, so that it can be fitted and welded to the spring with but little difficulty.

Figure 1:
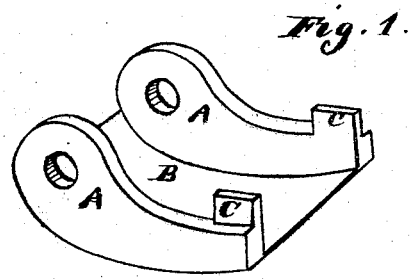
Figure 2:
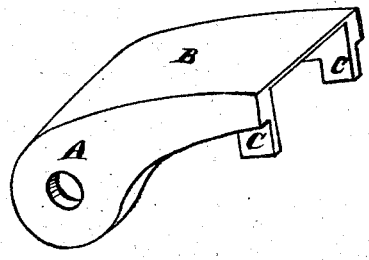

Referring to the accompanying drawings for a more complete explanation of my invention, Figure 1 is a perspective view of the head with the ears uppermost. Fig. 2 is a view of the head removed.

A A are two ears of a spring-head, and B is the back or connecting plate, which is of a width sufficient to admit the steel bar of which the spring is to be formed. Near the front of the side pieces A, I form two small lugs, C, which, when the spring-leaf has been introduced between the ears, are turned over, so as to hold the whole firmly together while it is being welded. This greatly reduces the labor necessary in uniting these heads to the spring-plate.

In order to make the heads rapidly, and with the least expense and labor, I construct them of cast-steel or of malleable iron, so that the spring-leaf can be laid in and welded at once.

Having thus described my invention, what I claim, and desire to secure by Letters Patent, is—

A spring-head composed of the ears A A, back-plate B, and lugs C C, formed in one piece, substantially as and for the purpose described.

In witness whereof I hereunto set my hand and seal.

JOHN SMITH. [L. S.]

Witnesses:
JNO. L. BOONE,
C. M. RICHARDSON.